United States Patent [19]
Krueger

[11] Patent Number: 5,895,844
[45] Date of Patent: Apr. 20, 1999

[54] PRECISE FUEL FLOW MEASUREMENT WITH MODIFIED FLUID CONTROL VALVE

[75] Inventor: William R. Krueger, New Berlin, Wis.

[73] Assignee: Outboard Marine Corporation, Waukegan, Ill.

[21] Appl. No.: 08/864,505

[22] Filed: May 29, 1997

[51] Int. Cl.[6] ............................................. G01M 15/00
[52] U.S. Cl. ................................... 73/119 A; 123/445
[58] Field of Search .......................... 73/118.1, 119 A, 73/116, 117.3; 123/445, 479

[56] References Cited

U.S. PATENT DOCUMENTS

| | | |
|---|---|---|
| 4,183,467 | 1/1980 | Sheraton et al. |
| 4,327,695 | 5/1982 | Schechter . |
| 4,329,951 | 5/1982 | Seilly . |
| 4,355,620 | 10/1982 | Seilly et al. |
| 4,356,979 | 11/1982 | Dobler . |
| 4,414,845 | 11/1983 | Hofmann ........................ 73/119 A |
| 4,482,093 | 11/1984 | Hafner et al. . |
| 4,483,480 | 11/1984 | Yasuhara ........................ 73/119 A |
| 4,499,876 | 2/1985 | Yamamoto ........................ 123/446 |
| 4,502,326 | 3/1985 | Kaczynski ....................... 73/119 A |
| 4,545,530 | 10/1985 | Hofmann et al. ................ 73/119 A |
| 4,575,008 | 3/1986 | Kaczynski ....................... 73/119 A |
| 4,624,135 | 11/1986 | Bungay et al. .................. 73/119 A |
| 4,665,742 | 5/1987 | Abt et al. ....................... 73/119 A |
| 4,667,511 | 5/1987 | Mausner ........................ 73/119 A |
| 4,718,386 | 1/1988 | Gieles . |
| 4,852,535 | 8/1989 | Rollenitz et al. ................ 73/119 A |
| 4,955,340 | 9/1990 | Elliott .............................. 123/297 |
| 4,986,117 | 1/1991 | Yoshizu et al. .................. 73/119 A |
| 5,000,042 | 3/1991 | Luebbering ...................... 73/119 A |
| 5,005,404 | 4/1991 | Ricco et al. . |
| 5,107,700 | 4/1992 | Kuttner et al. .................. 73/119 A |
| 5,197,429 | 3/1993 | Kita ................................ 73/119 A |
| 5,226,311 | 7/1993 | Scourtes ......................... 73/119 A |
| 5,351,548 | 10/1994 | Briggs et al. ................... 73/119 A |
| 5,485,957 | 1/1996 | Sturman . |
| 5,795,998 | 8/1998 | Smith ............................ 73/119 A |

Primary Examiner—George Dombroske
Assistant Examiner—Eric S. McCall
Attorney, Agent, or Firm—Jones, Day, Reavis & Pogue

[57] ABSTRACT

A modified fuel injector is fitted with a position sensing device that starts sending position information to the ECU at the onset of pressurization and displacement of fuel in the injector. Thus the effective stroke of the piston in the injector valve can be made to represent the fuel that is delivered to each cylinder of an engine. A position sensor is attached to the injector valve piston assembly. By electronically measuring the amount of effective piston travel, i.e. the piston travel that commences at the onset of pressurization of the injector valve, the amount of fuel delivered to the cylinder is known.

19 Claims, 3 Drawing Sheets

PRECISE FUEL FLOW MEASUREMENT WITH MODIFIED FLUID CONTROL VALVE

BACKGROUND OF THE INVENTION

1. Field of the Invention

The present invention relates in general to a fuel injection system for supplying fuel to an internal combustion engine and in particular to such a system for electronically measuring the amount of effective piston stroke travel in a fuel injector while compressing and displacing fuel in a chamber therein to determine the precise amount of fuel delivered to an engine cylinder by the piston movement.

2. Description of Related Art Including Information Disclosed Under 37 CFR 1.97 AND 1.98

It is well known in the prior art that fuel injection systems for supplying fuel to an internal combustion engine utilize a fluid control valve such as a fuel injector that includes a pumping plunger or piston, a solenoid, and an armature for directly actuating the pumping plunger or piston upon energization of the solenoid. The pumping plunger pressurizes fuel in a chamber and the pressurized fuel is forced through an injection nozzle by the pumping plunger to an engine cylinder. The injection nozzle includes a fuel pressure responsive valve that is opened to allow fuel flow when the pressure of fuel supplied to the nozzle attains a predetermined value.

In such a system, the extent of movement of the piston determines the amount of fuel supplied through the injection nozzle to the combustion chamber.

Most such piston-type pumps have some leakage through the piston/cylinder clearance. This leakage past the piston results in a small amount of piston travel that does not displace fuel and thus does not deliver fuel to the engine and is an error in the measured fuel delivery versus piston movement. Furthermore, this leakage changes as parts wear and can also vary with changes in temperature of the fuel injector or the fuel flowing through it. Small variations in manufacturing tolerances from unit to unit can also lead to errors. Such injectors are disclosed in U.S. Pat. No. 4,329,951 and U.S. Pat. No. 4,355,620.

It would be advantageous to have a fuel injector that operated as an accurate flow meter that would electronically measure the amount of effective piston travel to enable the amount of actual fuel delivered to the cylinder to be known. In such case, the fuel injector would become a fuel measurement system as well as a fuel delivery system and most of its parts would do double duty as it performs both functions.

"Effective" piston travel is defined herein as that distance of piston travel that actually results in a displacement of fuel from the fuel injector to the combustion cylinder.

SUMMARY OF THE INVENTION

The present invention involves a modified fuel injector that is a fixed displacement pump whose effective stroke can be made to represent the fuel that is delivered to each cylinder of an engine. To make the fuel injector function properly as an accurate flow meter, a position sensor is attached to the fuel injector piston assembly The fuel injector is also fitted with a position sensing device that starts sending position information to the electronic control unit only at the onset of fuel compression (and thus fuel displacement) by the piston stroke travel. As will be seen, the onset of compression does not occur until after the piston has overcome the leakage. Piston movement prior to the onset of compression can be ignored or taken into account by the electronic control unit (ECU) and can be used to determine the "effective" piston travel and thus determine very accurately the fuel that is actually delivered by the piston stroke.

Movement of the piston can be detected by photo-optic pickup, inductive pickups, capacitor plates, and the like.

The point at which fuel compression actually begins can be determined by a valve switch in the fuel inlet port, a needle valve switch in the fuel outlet port to the cylinder, or a pressure sensor in the injector fuel chamber. A plastic fuel input fitting on the injector has a metal, electrically isolated, seat. A lead is brought out from the metal seat and from the metal spring assembly that tends to hold a metal ball in a closed position against the metal seat, thus forming a switch. This switch is normally held open (against spring pressure) by fuel flow which fills and purges a fuel chamber when it is not delivering fuel to the engine. It closes at the start of injection after any lost motion of the valve piston occurs. The piston movement causes the ball valve to close and, when the valve closes, the resulting pressure opens the injector needle and fuel is sprayed into the cylinder until the forward motion of the valve piston stops, at which time the pressure rapidly decreases in the valve chamber and the switch opens. After this, the valve piston returns to its starting point. Thus the output of the ball switch represents substantially the true fuel delivery part of the valve stroke and is used to tell the electronics what part of the valve piston travel to measure.

The sensor technology and associated electronics used to measure the total valve piston movement can have many forms such as a photo-optic system that uses a number of fine teeth cut in a piece of metal that is attached to the end of the piston assembly. The piston moves the comb-like teeth and interrupts light coming from a light-emitting source. These light interruptions are converted into an electrical signal by a photo receiver and are sent to the electronic control unit (ECU) where a counter counts the number of teeth that have passed the light source during the time the ball switch is closed. This count is a measure of distance travelled by the piston (after lost motion movement) and thus fuel delivered. Further, measuring the time interval of light occurrence between adjacent teeth represents the changing speed of the piston and can be used to obtain an acceleration or speed profile that gives additional information about the delivery cycle.

Another possible sensor is an inductive pickup that consists of a coil whose core is attached to the piston assembly and that moves as the piston moves. This moving core produces a varying inductance that can be measured by suitable electronics well known in the art and that represents distance and speed of piston movement. Again, the output from the valve ball switch would tell the electronics the "effective" part of the piston stroke to measure.

Another possible sensor is a variable capacitor that has one plate attached to the piston assembly and the other plate fixed to the valve body. The motion of the plate attached to the piston would cause a change in capacitance that is measured electronically and would represent distance and speed of movement of the piston. Again, the valve ball switch tells the electronics the "effective" part of the piston stroke to measure.

Further, the present invention has automatic calibration. Most piston pumps have some leakage through the piston/cylinder clearance. This leakage past the piston results in a small amount of piston travel that does not deliver fuel to the engine (lost motion) and is an error in the measured fuel delivery versus piston movement. Furthermore, this leakage changes as parts wear and can also vary with changes in temperature of the fuel valve or the fuel flowing through it. Small variations in manufacturing tolerances from unit to unit can also lead to errors.

Leakage and temperature errors can be compensated with the application of a special calibration signal that is sent to the fuel valve. This signal coming from the ECU produces enough pressure to close the valve ball switch (less than 10 PSI needed) but not enough to open the injector needle (more than 100 PSI needed). The result of the calibration signal is a slow piston movement whose amount of travel is proportional to the leakage rate. This information is sent via the position transducer or sensor to the ECU and is used as a correction factor when calculating fuel delivery in normal use. The calibration procedure can be run as often as needed to compensate for changes during the life of the engine.

A valve switch can also be made from an electrically isolated ring that is part of the injector nozzle and would also indicate the flow of fuel in that the switch would be open only when the movable injector needle is off the seat and fuel is being delivered.

Another variation would have a pressure switch in the valve pressure chamber operated by pressure in the chamber. This signal would produce a start/stop indication. After the lost motion of the piston is overcome, the pressure suddenly increases in the chamber. This would produce a "start" signal from the pressure switch for the ECU so that it could measure the time from the sudden increase in pressure to the decrease to zero pressure, again measuring the "effective" stroke of the piston.

Because the fuel injector valve is a major part of the fuel flow measuring system, it would not be necessary to measure the fuel flow of every fuel injector valve to every cylinder on all engine revolutions. For example, measuring the flow to each cylinder of a multi-cylinder engine at the rate of one-cylinder-per-revolution would allow the use of one electronic measuring circuit that would be switched to each fuel injector valve as its turn comes up (multiplexed). This would save the cost of five measuring circuits on a six-cylinder engine.

Thus the present invention relates to a fuel flow measurement system that provides closed loop control of a fuel injector valve used on a fuel injected engine.

The present invention also relates to a fuel measurement system that uses the fuel injector valve itself as a major part of the fuel flow measuring system.

The invention also relates to the use of the novel fuel flow measurement system along with airflow measurement that allows a closed loop air/fuel ratio control system.

The present invention further relates to the use of the novel fuel valve with an electronic control unit that can ask for a given amount of fuel to be delivered from the control valve to a specific cylinder.

The present invention also relates to the use of a modified flow control injector valve as a fuel flow measurement device such that separate fuel flow meters do not have to be installed on each cylinder of an engine.

The present invention further relates to the use of an accurate flow meter on an individual cylinder basis, even given the nature of the pulsed fuel flow coming out of the fuel flow control injector valve.

The present invention further relates to the ability to measure the fuel going to each cylinder on a per-revolution basis, which means more accuracy as well as being able to run different fuel rates to different cylinders to compensate for further engine variables The present invention also relates to compensation of production tolerances of the fuel flow control injector valve and the injector nozzle assembly to assure a more uniform flow rate from unit to unit because of the individual fuel control valve delivery measurement.

The present invention further relates to the application of a special control signal from the electronic control unit such that the fuel flow control injector valve with its nozzle assembly can be periodically recalibrated, such as each time the engine is started, thereby having the ability to automatically recalibrate as parts wear and thus assuring improved performance throughout the life of the engine. Further, the present invention enables the ECU to register how much fuel is delivered and therefore any difference between requested fuel delivery and actual fuel delivery could signal a malfunctioning fuel control injector valve and thus generate a warning signal to the operator of the need for service and further enable the ECU to cause the engine to revert to a self-protect mode where oil flow is increased and maximum speed is limited.

The present system also relates to a novel fuel flow control injector valve that enables the ECU to total fuel delivery and thus give an indication of fuel consumption in gallons or gallons per hour as well as the display of fuel remaining on board.

Thus, the present invention relates to a system for electronically measuring the amount of effective piston stroke travel in a fuel injector while compressing and displacing fuel in a chamber therein to determine the precise amount of fuel delivered to an engine cylinder by the piston movement, the system comprising a first sensor on the injector for detecting the actual amount of piston stroke travel and generating a corresponding first signal, a second sensor on the injector for detecting the onset of fuel compression and displacement by the piston stroke travel and generating a corresponding second signal, and an electronic control unit coupled to the first and second sensors and having a measuring circuit for calculating effective piston stroke travel only from the onset of the fuel compression and displacement as determined by the second signal and therefore determining the precise amount of fuel ejected on each piston stroke.

BRIEF DESCRIPTION OF THE DRAWINGS

These and other features of the present invention will be more fully disclosed when taken in conjunction with the following DETAILED DESCRIPTION OF THE PREFERRED EMBODIMENTS in which like numerals represent like elements and in which.

DETAILED DESCRIPTION OF THE PREFERRED EMBODIMENTS

Figure 1A:
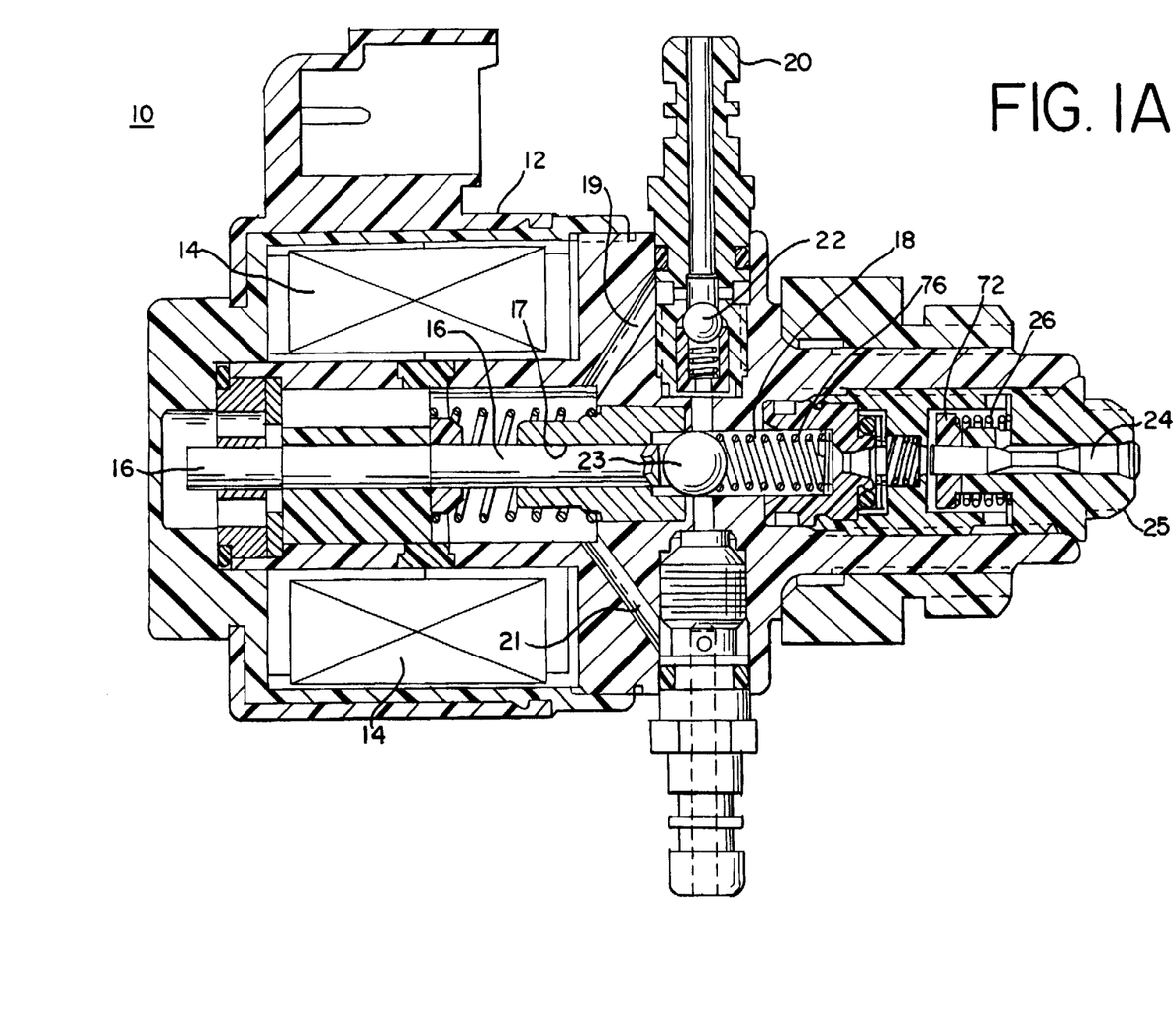
FIG. 1A is a schematic representation of a fuel flow control valve or fuel injector as it can be modified according to the present invention.

FIG. 1A is a diagrammatic representation of a modified version of a fuel flow control injector valve 10. It generally comprises a housing 12, having therein electrical solenoid coils 14 for receiving electrical signals from the electronic control unit (shown as 84 in FIG. 2A and FIG. 3) to control movement of piston 16, along its longitudinal axis. Moving of the piston 16 compresses fuel, in a chamber 18, that is received through a fuel port 20 in which a ball valve 22 is located. The fuel generally enters port 20 and passes spring-loaded ball 22 to fill chamber 18. It also passes along path 19, 21 as a constant purge. When piston 16 begins to move against a second ball 23 in chamber 18, fuel in the chamber 18 is compressed thus closing ball valve 22 and opening needle valve 24 by compressing spring 26. This allows the pressurized fuel to be ejected from nozzle 25 into a cylinder of an automobile or other engine. Ball valve 22 in input port 20 is spring-loaded and requires 10 PSI or less to open it. However, the spring 26 biasing needle valve 24 to the closed position requires in excess of 100 PSI to open.

Thus, movement of the piston 16 is generally detected by some type of sensor and the signal sent to the electronic control unit to calculate fuel displacement based upon piston travel. As is well known, however, such calculation is not accurate because these piston-type pumps have leakage through the piston/cylinder clearance. The leakage past the piston results in a small amount of piston travel (lost motion) that does not deliver fuel to the engine and is an error in the measured fuel delivery versus piston movement. Furthermore, this leakage changes as parts wear and can also vary with changes in temperature of the fuel flow control valve or the fuel flowing through it. Small variations and manufacturing tolerances from unit to unit can also lead to errors.

Thus, the actual amount of fuel delivered depends upon the "effective" piston stroke, which, as stated earlier, is defined as the movement of the piston after the point where the fuel in the chamber 18 becomes compressed and fuel displacement begins. It is necessary, therefore, to subtract that portion of the piston movement that does not result in compression and displacement in chamber 18 due to the leakage. Thus, two factors need to be considered. The first is the actual distance travelled by the piston 16, and the second is the effective distance travelled by the piston 16.

Figure 1B:
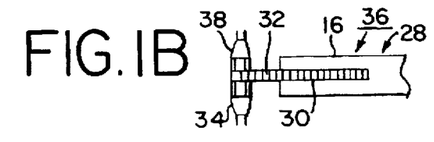
FIGS. 1B, 1C, 1D, and 1E represent sensors attached to the control valve for determining total valve piston movement.
Figure 1C:
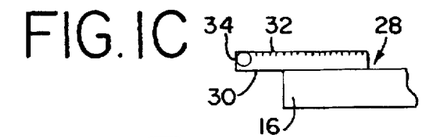

The actual movement of piston 16 can be determined in a number of ways. For instance, in FIG. 1B and FIG. 1C, a photo-optic pickup system 28 is shown in which an extension 30 has a plurality of teeth 32 cut therein and is attached to the piston 16 in any well-known fashion. A light source 34 is on one side of the projection 30, such as shown in the top view 36 and a light receiver 38 is on the other side to receive the light. Thus, the piston moves the comb-like teeth 32 and interrupts the light coming from the light source 34, which may be a light-emitting diode. These light interruptions are converted into an electrical signal by the receiver 38 and are sent to a counter in the ECU that counts the number of teeth that have passed the light source 34 during the time of piston movement.

Figure 1D:
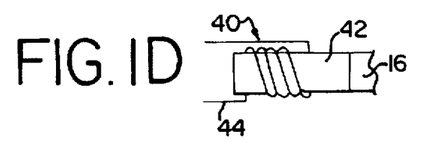

In a similar manner, an inductive pickup 40 could be used as illustrated in FIG. 1D. It has a core 42 attached to the piston 16 that moves with the piston 16. A coil 44 surrounds the core 42 and the moving core produces a varying inductance that can be measured by suitable electronics to represent not only distance but the speed of piston movement.

Figure 1E:
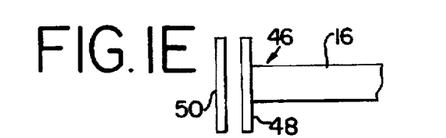

In like manner, as shown in FIG. 1E, a variable capacitor 46 could be utilized that has a movable plate 48 attached to the piston 16 and which moves with the piston and has a fixed plate 50 attached to the housing 12 or other stationary source (not shown). The motion of the plate 48 attached to the piston 16 with respect to fixed plate 50 would cause a change in capacitance that is measured electronically and would represent not only the distance but also the speed of the piston movement.

Figure 1F:
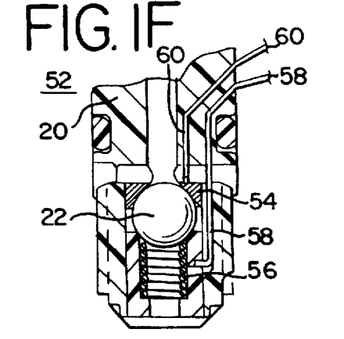
FIGS. 1F, 1G, and 1H are fuel flow sensors for determining "effective" piston travel.
Figures 3, 4, 5A, 5B, 6:
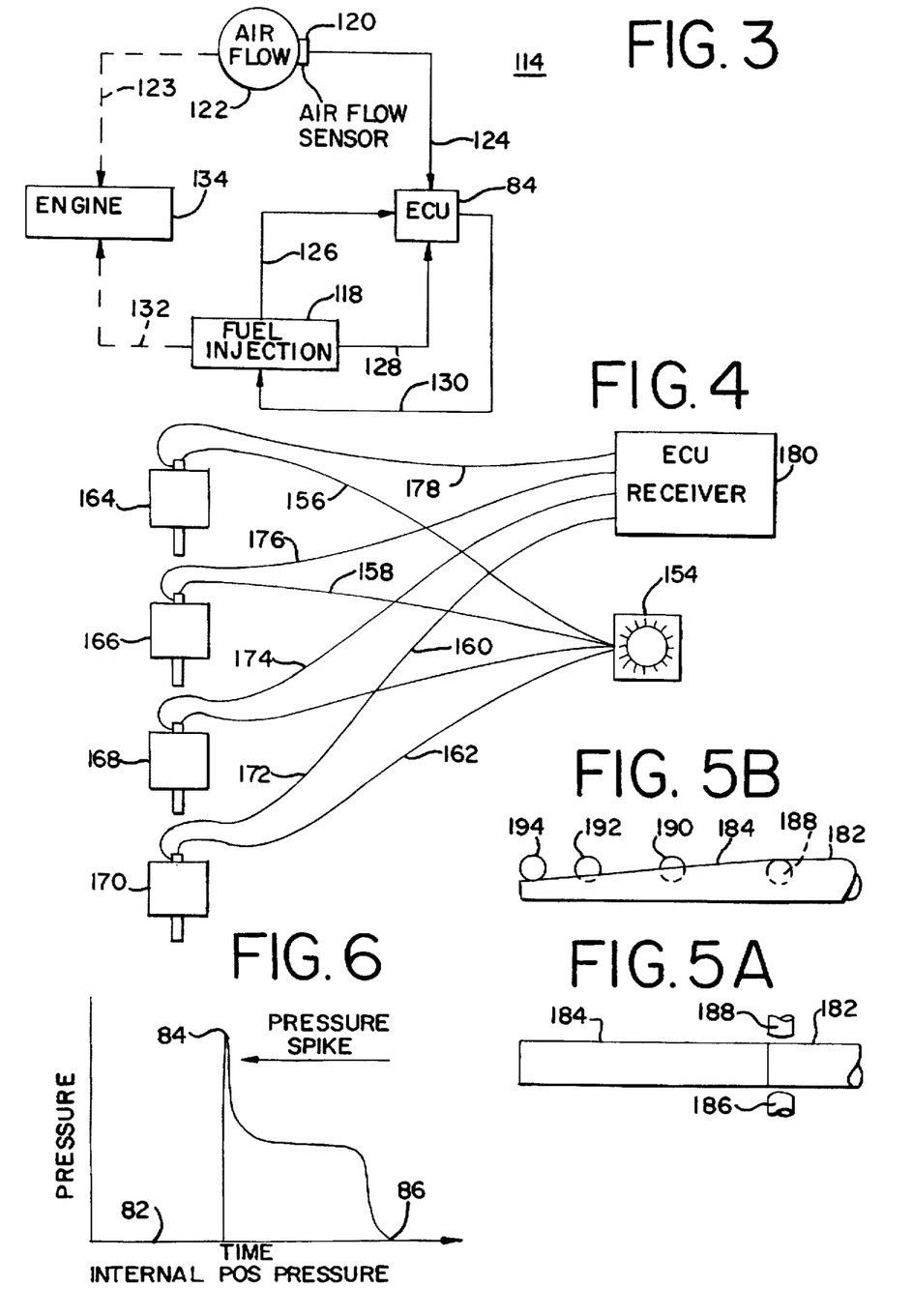
FIG. 3 is a schematic diagram of the airflow and sensor and the fuel injector sensor such that the ECU can vary the fuel being injected to achieve a desired engine fuel/air ratio.
FIG. 4 is a schematic representation of a single light source being coupled through fiber-optic cables to each fuel injector and the detected output being carried by fiber-optic cables to the ECU receiver for determining effective travel of the piston in the fuel control injector valve.
FIGS. 5A and 5B represent a sensor that detects a sloping surface on a piston to allow more light to be passed to a receiver as a function of distance travelled by the piston.
FIG. 6 is a graph of the internal fuel control injector valve pressure versus time to illustrate the pressure spike received at the onset of pressurization of the fuel chamber therein.

As stated earlier, however, in order make the fuel injector valve 10 measure "effective" piston travel, it must be modified. One modification is illustrated at 52 in FIG. 1F, which is an enlargement of the input port 20, including ball valve 22. Note that the input port 20 may be made of plastic. The valve switch is formed of a metal ball 22 and a metal seat 54. The metal ball 22 is urged against the metal seat 54 by a metal spring 56. When the valve ball 22 is resting on seat 54, an electrical circuit couples electrical lead 58 (attached to spring 56) and electrical lead 60 (attached to metal seat 54) thus generating a first signal. When fuel entering passageway 62 in the port 20 causes ball 22 to move away from metallic seat 54 and compress spring 56, the electrical circuit is broken between leads 58 and 60, thus telling the ECU that fuel is entering the chamber 18 of the fuel flow control valve 10. When piston 16 begins to move, it has some lost motion due to leakage about the piston and the cylinder bore 17. Thus pressure in chamber 18 does not begin to increase until the piston has overcome the lost motion due to leakage as shown by area 82 in FIG. 6. At that time, pressure in chamber 18 begins to increase rapidly to point 84 (see FIG. 6) and ball 22 is forced against the seat 54, thus completing a circuit between leads 58 and 60 and telling the ECU when the "effective" movement of the piston begins. At the end of the "effective" piston movement (86 in FIG. 6), the pressure has decreased (as shown in FIG. 6) and ball 22 is again moved away from seat 54 and the switch opens telling the ECU that "effective" movement of the piston 16 has ended. Thus, there is a compensation for the lost motion of piston 16 due to leakage and an accurate measurement of fuel delivery can be made.

Figure 1G:
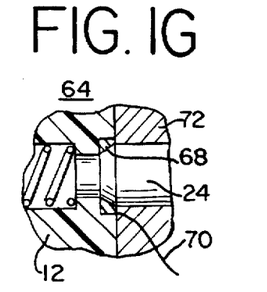

Another version of a modified fuel flow control valve 10 is illustrated in FIG. 1G at 64, which is an enlarged portion of the base of the needle valve 24. A conductive area or seat 68 is formed in the plastic fuel flow control valve body 12 (12 in FIG. 1G). When the needle valve 24 rests against the metallic seat 68, signals develop between electrical conductors 70 and 72. Conductor 72 may simply be a ground to the metal fixture portion surrounding the needle valve 24. When the pressure increases in chamber 18 sufficient to open needle valve 24, the time that the valve is open can be determined because the signal between leads 70 and 72 will be broken when the valve opens as shown by 84 in FIG. 6 and will resume when the needle valve 24 closes as shown by 86 in FIG. 6. Thus, the exact amount of time the valve is open can be determined and the precise amount of fuel injected determined. Thus, again, only "effective" piston travel is measured.

Figure 1H:
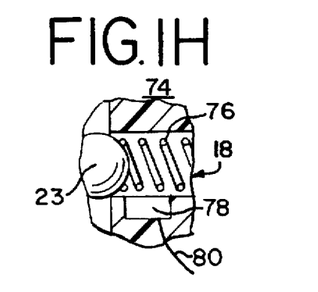

Still a third modification of the fuel flow control valve 10 is illustrated in FIG. 1H at 74. The modification 74 includes a pressure sensor 78 abutting the chamber 18 that is pressurized when piston 16 moves second ball 23 against spring 76. At a time when the lost motion of the piston 16 is exceeded (at the end of time 82 in FIG. 6), then the chamber 18 begins to be pressurized and there is a sudden change of pressure as shown at 84 in FIG. 6. In FIG. 6, the area 82 is the lost motion time of the piston 16. When it is overcome, the pressure in chamber 18 suddenly rises to a peak 84 extremely rapidly and fuel displacement begins substantially simultaneously. Pressure detector 78 detects that sudden rise in pressure and transmits a signal on line 80 to the ECU. When the pressure has returned to zero because of all the fuel being ejected or displaced from chamber 18, as shown at point 86, the pressure detector 78 again sends a signal to indicate that point in time. Thus, an accurate determination can be made of the time the needle valve is open between points 84 and 86.

Thus, the modified fuel flow control valve or injector 10 in FIG. 1A is a fixed displacement pump (for an approximate power input) whose effective stroke can be made to represent the fuel that is delivered to each cylinder of an engine. The sensors 28, 40, and 46 in FIG. 1B, FIG. 1D, and FIG. 1E, respectively, represent a first sensor on the injector 10 for detecting the actual amount of piston stroke travel and generating a corresponding first signal.

The valve switch 52, needle valve switch 64, and the pressure switch 74 represent second sensors on the injector for detecting the onset of fuel compression by the piston stroke travel and generating at corresponding second signal. The electronic control unit is coupled to the first and second sensors as shown in FIG. 2A and has a measuring circuit, well known in the art, for calculating effective piston stroke travel only from the onset of the fuel compression and displacement as determined by the second signal and therefore determining the precise measurement of fuel ejected on each piston stroke.

Because the pressure buildup in the chamber 18 after the finish of lost motion travel of the piston is so rapid, the embodiment 64 in FIG. 1G wherein the needle valve 24 sends a signal when it opens and separates from the valve seat 68, the needle valve circuit 64 acts as a second sensor means on the injector for detecting the onset of fuel compression by the piston stroke travel and generates the corresponding second signal. Thus, in FIG. 1F, 1G, and 1H, the alternate circuits 52, 64, and 74 all act as the second sensor means on the injector for detecting the onset of fuel compression by the piston stroke travel. Either the photo-optic pickup system 28, the inductive pickup 40, or the capacitive pickup 46, in FIGS. 1B, 1D, and 1E, acts as the first sensor on the injector for detecting the actual amount of piston stroke travel and generating a corresponding first signal.

Figures 2A, 2B:
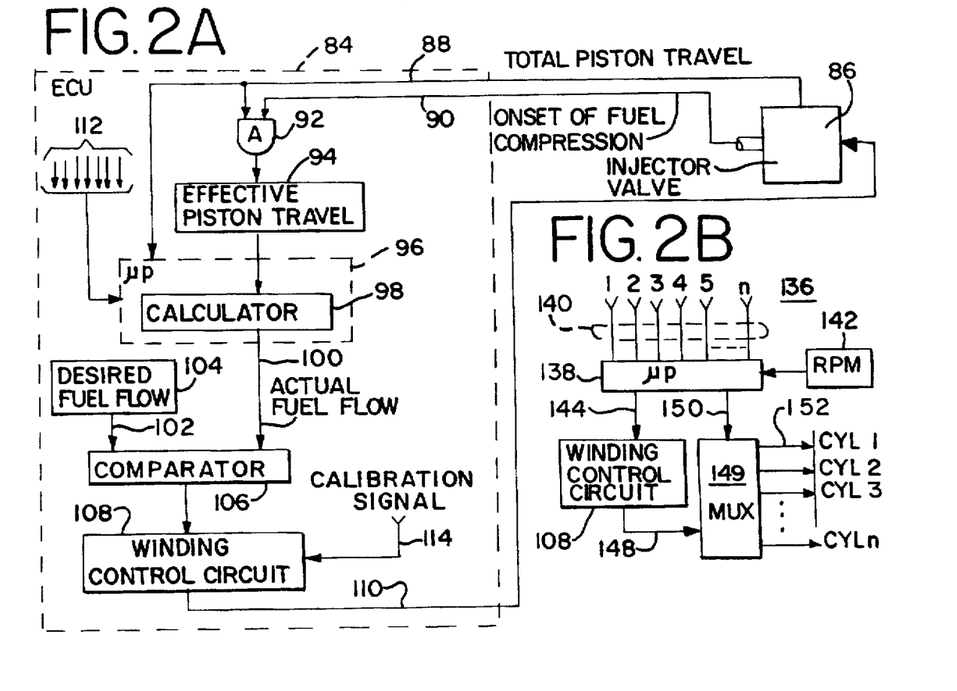
FIG. 2A is a schematic representation of the electrical system of the present invention where the output of the injector valve is coupled to the electronic control unit which detects the effective piston travel, compares the actual fuel flow to a desired fuel flow, and sends a control signal to the injector valve to control piston movement.
FIG. 2B is a schematic diagram of a signal multiplexer having an input coupled to the electronic control unit and a plurality of outputs such that only one measuring circuit in the electronic control unit can be used sequentially with each fuel injector to measure fuel delivered thereby.

FIG. 2A illustrates the control of the injector valve 86 by the electronic control unit 84. The total piston travel signal on line 88 from the first sensor that detects the actual amount of piston stroke travel is coupled to the AND-gate 92 in the ECU 84. In addition, the second signal on line 90 generated by the second sensor on the injector detecting the onset of fuel compression by the piston stroke travel is also coupled to AND-gate 92. This means there will be no output from AND-gate 92 until the lost motion of the piston has been exceeded which occurs at the onset of actual fuel compression as determined by the signal on line 90. Thus, effective piston travel is determined at 94 by well-known circuitry in the ECU and an output is coupled to the microprocessor 96, which has a calculator 98 for calculating actual fuel flow in a well-known manner based on the effective piston travel determined at 94. The actual fuel flow signal on line 100 is compared to the desired fuel flow on line 102, which is established by a unit 104 in the ECU 84 again well known in the art. Comparator 106 compares the desired fuel flow with the actual fuel flow and sends a signal to the winding control circuit 108 that generates a control signal on line 110 to the injector valve 86 to control the amount of the piston movement. Thus, the effective stroke of the injector valve 86 piston is made to represent the fuel that is delivered to each cylinder of an engine. Only one injector valve 86 is shown connected to the ECU 84 in FIG. 2A but the others would have inputs to the ECU represented schematically by lines 112 that correspond to the signals on lines 88 and 90 to corresponding AND-gates 92 (not shown) and the effective piston travel calculator circuit 94. The output of the effective piston travel calculator circuit 94 would be determined in a similar manner for the signals on lines 112 for the other injector valves (not shown) with separate outputs being generated from their own winding control circuits 108 to a respective injector valve.

Since the injector valves or fuel flow control valves 86 have some leakage through the piston-cylinder clearance, this leakage results in the small amount of piston travel (lost motion) and does not deliver fuel to the engine and is an error in the measured fuel delivery versus piston movement. Furthermore, this leakage changes as parts wear and can also vary with changes in temperature of the fluid flow control valve or injector valve and can also vary with changes in temperature of the fluid flow control valve or the fuel flowing through it. Small variations in manufacturing tolerances from unit to unit can also lead to errors. The circuit shown in FIG. 2A can compensate for such leakage and temperature errors by applying a special calibration signal on line 114 (from microprocessor 96) through the winding control circuit 108 that is sent to the injector valve 86 on line 110. The signal on line 110 coming from the ECU 84 produces enough pressure to close the value/switch in injector valve 86 (less than 10 PSI needed) but not enough to open the injector needle (more than 100 psi needed). The result of the calibration signal is a slow piston movement whose amount of travel is proportional to the leakage rate. This information is sent via the signal on line 88 from valve 86 to the ECU 84 and is used as a correction factor by the calculator 98 when calculating fuel delivery in normal use. The calibration procedure can be run as often as needed to compensate for changes during the life of the engine.

Some applications of the fuel measuring system may not need to measure the fuel flow of every fuel injector to every cylinder on all engine revolutions. For example, measuring the flow to each cylinder of a multi-cylinder engine at the rate of one-cylinder-per-revolution would allow the use of one electronic measuring circuit that would be switched to each fuel injector, through a multiplexer, as its turn comes up. This would save the cost of five measuring circuits on a six-cylinder engine. Such a system is illustrated in FIG. 2B. System 136 includes a microprocessor 138 in the electronic control unit that receives the necessary signals 1-n from the fuel injectors as indicated by inputs 140 to the microprocessor 138. The RPM indicator 142 sends a signal to the microprocessor 138 to indicate a particular reference point, such as the beginning of each revolution of the crankshaft. The microprocessor 138 can then look at the signals from the first fuel injector during a first revolution of the engine and determine the control needed on line 144 to the winding control circuit 108. The winding control circuit 108 produces the necessary control signal on 148 that is coupled to a multiplexer 149. The microprocessor 138 selects the circuit through multiplexer 149 with a signal on line 150 to couple the output on line 152 to the first cylinder to control the fuel being injected thereto. When the RPM indicator 142 generates the next signal indicating that the next revolution is commencing, the microprocessor repeats the same process for the signals from fuel injector number two and likewise to the corresponding fuel injector.

FIG. 3 is a schematic representation of a system involving the control of the fuel injector to provide a closed loop air/fuel ratio control system. The novel control system 114 shown in FIG. 3 comprises the electronic control unit 84 coupled to fuel injector 118 (only one shown) and an airflow sensor 120 coupled to airflow unit 122 that provides air to the engine as indicated by phantom line 123. The output signal on line 124 from airflow sensor 120 representing the amount of air being conveyed to engine 134 is coupled to the ECU 84. The first sensor signal on line 126 that represents the actual amount of piston stroke travel and the second sensor signal on line 128 that represents the onset of fuel compression by the piston stroke is coupled to the ECU 84 that generates a control signal on line 130 to regulate the amount of fuel being coupled to the engine cylinders as indicated by phantom line 132. Thus, the ECU, 84, knowing the desired fuel/air ratio, can calculate the actual fuel/air ratio and then adjust the amount of fuel being injected by fuel injector 118 to provide the proper fuel/air ratio.

In one configuration providing a light source and light receiver on the injector to form the first sensor for detecting the actual amount of piston stroke travel, light can be delivered to each fuel injector from a single light source using fiber-optic cable rather than having a separate light built into each fuel injector. Light coming from the output side of the transducer 28 shown in FIG. 1A could get back to the receiver by fiber-optic cable. Such a system is schematically represented in FIG. 4 wherein a single light source 154 couples light through fiber-optic cables 156, 158, 160, and 162 to each of the fuel injectors 164, 166, 168, and 170. Light from the output side of the transducer is coupled by fiber-optic cables 172, 174, 176, and 178 to the light receiver 180 in the electronic control unit. Thus, by placing the light source and the detector in the electronic measuring circuit and using fiber-optic cable to transmit the input and output light between the fuel injector and the electronic measuring circuit, electrical noise generated by the fuel injector would be kept from interfering with the light emitter and detector shown in FIG. 1B as well as reduce the space needed in the fuel injector for the light source and receiver.

Another first sensor variation is illustrated in FIG. 5A and FIG. 5B. FIG. 5A is a top view of the sensor while FIG. 5B is a side view. With this version, travel of the piston 182 at least partially blocks the light getting to the receiver 188, from source 186, thus producing a varying light signal that is governed by the distance of piston travel. As can be seen in FIG. 5A, and more clearly in 5B, piston 182 has a portion 184 that forms a sloping ramp. When the piston is the position shown in FIG. 5A and FIG. 5B, the light detector 188 is completely blocked from light source 186 by the piston 182. As the piston 182 moves to the right, a part of the light receiver 188 is exposed as shown at 190 and receives some light from the light source 186. As the piston 184 travels further to the right, at position 192 more light is detected by the light detector 188 and at position 194, the light source 186 is completely exposed to the light detector 188. Thus, a varying light signal is produced that is governed by the distance of piston travel.

Thus, there has been disclosed a novel system for electronically measuring the amount of "effective" piston stroke travel in a fuel injector while compressing and displacing fuel in a chamber therein to determine the precise amount of fuel delivered to an engine cylinder by the piston movement. The novel invention comprises modifying an existing fuel injector that has a first sensor thereon for detecting the actual amount of piston stroke travel and generating a corresponding first signal and by adding a second sensor on the injector for detecting the onset of fuel compression and displacement by the piston stroke travel and generating a corresponding second signal and coupling the first and second signals to an electronic control unit that has a measuring circuit for calculating effective piston stroke travel only from the onset of the fuel compression and displacement as determined by the second signal, thereby determining the precise measurement of fuel ejected on each piston stroke. The first sensor can either be a photo-optic pickup, an inductive pickup, or a capacitance pickup. The second sensor can be either a ball valve electrical switch on the fuel intake port, a pressure switch in the fuel chamber, or an electrical switch on the needle valve seat that detects when the needle valve opens.

When the photo-optic pickup system is used for the first sensor, an individual light source and light receiver can be used for each injector to detect movement of comb-like teeth or fiber-optic cables can carry light from a single source to a single receiver through a light interrupting device. In addition, the light interrupting device can be a sloping surface on the fuel injector piston that allows more light to be passed to the receiver as a function of distance travelled by the piston.

The present system incorporates an automatic calibration system for compensating for leakage through the piston/cylinder clearance of the injector valve. A special calibration signal is sent to the injector valve from the ECU that produces enough pressure to close the valve switch but not enough to open the injector needle. The result of the calibration signal is a slow piston movement whose amount of travel is proportional to the leakage rate. This information is sent via the position transducer (the modified injector valve) to the ECU and is used as correction factor when calculating fuel delivery in normal use.

In addition, the novel invention can be used with an airflow sensor to cause the ECU to control the amount of fuel being injected into a cylinder based on airflow to provide the proper air/fuel ratio.

Also, the novel invention contemplates using one calculator circuit coupled to all fuel injectors for receiving the signals from the fuel injector regarding effective piston travel and then using the same calculating circuit in sequence with each of the signals from the injectors to provide a winding control circuit output through a multiplexer to each of the fuel injectors in sequence so that the fuel flow of each fuel injector of a multi-cylinder engine can be measured at the rate of one-cylinder-per-revolution to allow the use of one electronic measuring circuit that would be switched to each fuel injector as its turn comes up.

Further, in the photo-optic systems, as stated, light may be delivered to and from each fuel injector from a single light source to a single receiver using fiber-optic cable rather than have a separate light built into each fuel injector.

The corresponding structures, materials, acts, and equivalents of all means or step plus function elements in the claims below are intended to include any structure, material, or act for performing the function in combination with other claimed elements as specifically claimed.

What is claimed is:

1. A system for electronically measuring an amount of effective piston stroke travel in a fuel injector while compressing and displacing fuel in a chamber therein to determine a precise amount of fuel delivered to an engine cylinder by said piston stroke travel, the system comprising:

a first sensor means on said injector for detecting an actual amount of piston stroke travel and generating corresponding first signal;

a second sensor means on said injector for detecting both the onset and the completion of fuel compression by said piston stroke travel and generating corresponding second and third signals; and an electronic control unit coupled to said first and second sensors and having a measuring circuit for calculating effective piston stroke travel only from the onset of said fuel compression as determined by said second signal and therefore determining a precise measurement of fuel ejected on each piston stroke.

2. The system of claim 1 wherein said second sensor means comprises:

a fuel input port associated with said fuel injector and having a fuel passageway that is coupled to said fuel injector chamber; and an electrical switch mounted in said fuel input port, said switch being closed to generate said second signal representing the onset of fuel compression caused by said piston stroke travel when no fuel is entering said chamber and being open to generate said third signal when fuel is entering said chamber representing the completion of said fuel compression and the cessation of said piston stroke travel.

3. The system of claim 2 wherein said electrical switch mounted in said fuel input port comprises:

a ball valve in said fuel passageway;

a ball valve seat in said fuel passageway;

a resilient means for forcing said ball valve against said valve seat to normally close said fuel passageway;

said ball valve, valve seat, and said resilient means being formed of electrically conductive material with said valve seat being electrically insulated from said fuel passageway; and electrical connection means coupled to said valve seat and said resilient means such that an electrically closed switch connection is formed to generate said second signal when said ball valve contacts said valve seat to indicate onset of fuel compression and an electrically open switch is formed when said ball valve moves away from said valve seat to generate said third signal indicating the cessation of said piston stroke travel.

4. The system of claim 3 wherein said resilient means is a spring means normally urging said ball valve to the closed position, sufficient fuel pressure causing said ball valve to overcome said spring means and move away from said valve seat to cause said third signal to be generated.

5. The system of claim 1 wherein said second sensor comprises:

a pressure sensor associated with said fuel chamber for detecting a sudden pressure change in said chamber;

an electrical switch associated with said pressure sensor for generating said second signal when said sudden pressure change occurs in said chamber.

6. A system of claim 1 wherein said second sensor means comprises:

an injector fuel output port having a fuel passageway coupled to said fuel injector chamber;

a needle valve in said fuel injector port biased in a normally closed position;

an electrical switch associated with said needle valve for generating said second signal indicating respectively when said needle valve is opened, thus representing the onset of fuel compression and corresponding fuel flow from said injector during the time said needle valve is opened and generating said third signal when said needle valve is closed; and an electronic control unit coupled to said electrical switch to determine precise measurement of fuel ejected on each piston stroke.

7. The system of claim 6 wherein said electrical switch comprises:

an electrically conductive ring associated with said fuel injector needle valve; and an electrically conductive ring seat on and electrically insulated from a body portion of said fuel injector for breaking electrical contact with said electrically conductive ring only when said needle valve is open and for making electrical contact when said needle valve is closed to generate said second and third signals thus providing an indication of the onset and completion of fuel compression to thereby provide a precise indication of fuel flow from said injector.

8. The system of claim 7 further comprising spring means normally urging said needle valve to said closed position such that sufficient fuel pressure in said chamber caused by said moving piston causes said onset of fuel compression and overcomes said spring means to open said needle valve and generate said second signal.

9. The system of claim 1 wherein said first sensor means comprises:

a light source and a light receiver mounted in spaced relationship on said fuel injector; and a light interrupting means attached to said piston and interposed between said spaced light source and said light receiver for generating said first signal representing actual travel of said piston.

10. The system of claim 9 wherein said light interrupting means comprises a series of comb-like teeth that produces light pulses representing distance traveled by said piston.

11. The system of claim 9 wherein said light source and said light receiver are fiber-optic cables that carry light to and from said light interrupting means.

12. The system of claim 10 wherein said light interrupting means comprises a sloping surface on said piston that allows more light to be passed to said receiver as a function of distance traveled by said piston.

13. The system of claim 1 wherein said first sensor means comprises an inductive pickup associated with said piston for generating said first signal by producing a varying inductance representing actual piston movement.

14. The system of claim 13 wherein said inductive pickup comprises:

a metal core associated with and moving with said piston; and a coil of electrically conductive wire on said fuel injector and wound around said core such that movement of said core within said coil produces said variable inductance.

15. The system of claim 1 wherein said first sensor comprises a variable capacitor associated with said piston such that movement of said piston causes a change in said capacitance to generate said first signal.

16. The system of claim 15 wherein said variable capacitor comprises:

a first plate fixedly attached to said fuel injector; and a second plate adjacent said first plate to form said capacitor, said second plate being associated with said piston such that piston movement changes the adjacent position of said second plate with respect to said first plate to change the capacitance and generate said first signal that represents actual movement of said piston.

17. The system of claim 1 further comprising:

a needle valve in said fuel injector movable between a closed and an open position;

bias means associated with said needle valve to bias said needle valve in the normally closed position;

a special calibration signal transmitted to said fuel injector by said electronic control unit to move said piston to generate sufficient pressure to cause said second sensor to generate said second signal but not sufficient to open said needle valve; and said first signal generated by said first sensor as said piston moves being coupled to said electronic control unit for calculating leakage rate of fuel around said piston, said leakage rate being utilized by said electronic control unit as a correction factor when calculating fuel delivery during normal operations of said fuel injector.

18. The system of claim 1 further comprising:

a signal multiplexer having an input coupled to said electronic control unit and having a plurality of outputs;

a fuel injector coupled to each multiplexer output; and a timing device coupled to said electronic control unit for causing the measurement of fuel delivered by each fuel injector on cyclically timed basis such that only one measuring circuit in said electronic control unit can be used sequentially with each fuel injector to measure fuel delivered thereby.

19. The system of claim 1 further including:

an air flow sensor for generating a signal representing air being used by said engine, said air flow sensor signal being coupled to said electronic control unit;

force generating means associated with said piston and being coupled to said electronic control unit for receiving current therefrom to cause said piston to move; and said electronic control unit calculating the actual engine fuel/air ratio and providing said current to said force generating means to vary the fuel being injected to achieve a desired engine fuel/air ratio.

* * * * *